M. A. SMITH.
METHOD OF AND APPARATUS FOR TAPPING OPEN HEARTH FURNACES.
APPLICATION FILED JULY 17, 1917.

1,247,606.

Patented Nov. 20, 1917.

WITNESSES

INVENTOR
Melton A. Smith
by D. Alsina
his Attorney

UNITED STATES PATENT OFFICE.

MELTON A. SMITH, OF VANDERGRIFT, PENNSYLVANIA.

METHOD OF AND APPARATUS FOR TAPPING OPEN-HEARTH FURNACES.

1,247,606.

Specification of Letters Patent.

Patented Nov. 20, 1917.

Application filed July 17, 1917. Serial No. 181,081.

*To all whom it may concern:*

Be it known that I, MELTON A. SMITH, a citizen of the United States, and resident of Vandergrift, in the county of Westmoreland and State of Pennsylvania, have invented certain new and useful Improvements in Methods of and Apparatus for Tapping Open-Hearth Furnaces, of which the following is a specification.

My invention relates to the handling of molten steel during the tapping of open-hearth furnaces and during the pouring of the tapped metal into molds, and while not restricted to such use, the invention more particularly relates to the handling of open-hearth steel in transferring the molten steel from the furnace into a series of successively filled ingot molds.

Heretofore, it has been the practice to convey the molten steel from the tapping hole of the open-hearth furnace directly into the pouring ladle in an uncontrolled stream, and later to pour the metal from the ladle into a mold or molds. The result is with such methods, that entrained slag flows from the furnace with the metal, becomes intimately mixed with the metal in the ladle, and is carried into the molds with the metal.

During the latter stages of the furnace tapping operation great care must be taken to prevent a rush of slag from the furnace from entering and becoming mixed with the steel in the ladle. The prevention of the slag from becoming mixed with the steel in the ladle is of particular importance in the manufacture of alloy steels, as for example, when additions are made to the steel in the ladle which are radically opposed to the slag, *i. e.* an acid addition and basic slag, or vice versa.

In such cases when slag becomes mixed with the steel in the ladle there is not only a large loss incurred of the additions made, but there also is liability of the phosphorus and manganese in the slag being "thrown down" into the steel as impurities, with the resulting failure of the steel to meet the required specifications. It is also a matter of general knowledge that after considerable time and trouble is taken in its refinement in the furnace, that a heat of steel can be very easily spoiled by having a rush of slag from the furnace during the tapping operation enter and become mixed with the steel in the ladle.

The primary object of my invention is to provide a method of tapping open-hearth furnaces wherein the above difficulties are avoided and overcome, whereby mixing of slag and the steel in the ladle is prevented, and whereby the exercise of extreme care in preventing the flow of slag from the furnace with the tapped steel is made necessary.

Another object of this invention is to provide a method of tapping open-hearth furnaces whereby the slag is separated and removed from the steel after leaving the furnace, and its entrance into the ladle with the steel is prevented and overcome.

A further object of the invention is to provide improved apparatus having novel means for handling the molten steel in the furnace tapping and mold filling operations.

Referring now to the drawings, forming part of this specification, Figure 1 is a plan showing an open-hearth furnace equipped with means for carrying out the method forming part of my invention.

Figure 1:
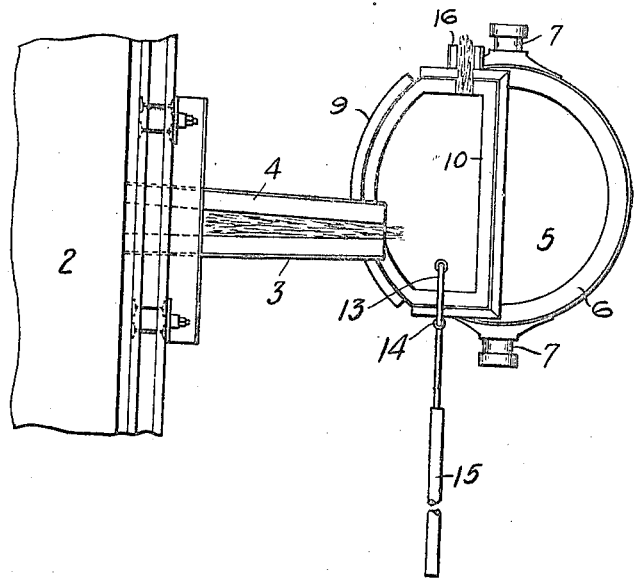
Figure 2:
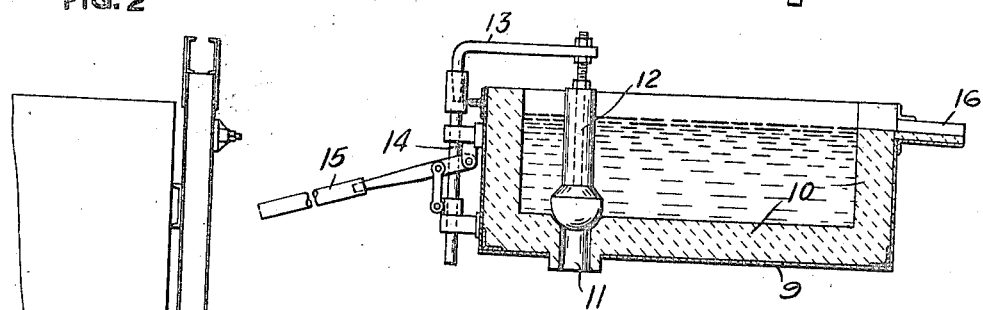
Fig. 2 is an end elevation of the same.
Figure 3:
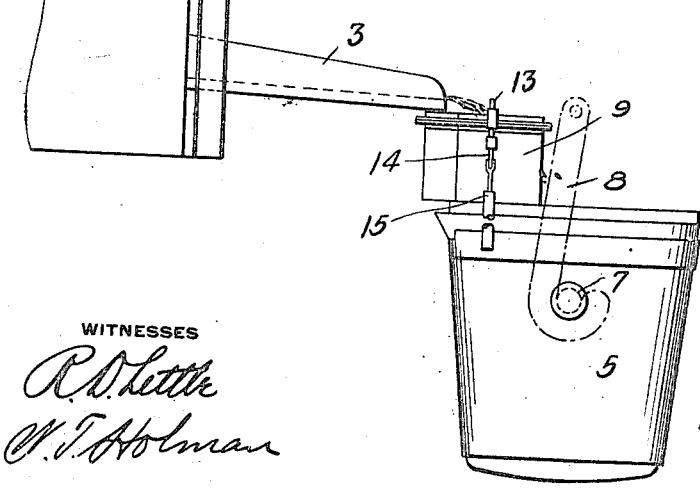
Fig. 3 is a sectional side elevation, on a larger scale, showing details in the construction and arrangement of the slag box shown in Figs. 1 and 2, and forming part of my improved apparatus.

In the accompanying drawings, the numeral 2 designates an open-hearth furnace having a tapping hole with a runner or trough 3 in vertical alinement with the tapping hole. The trough 3 which has a refractory lining 4 therein is inclined outwardly and downwardly. The tapping hole and trough 3, in other respects also, are constructed and arranged in the usual known manner, so as to deliver molten steel from the furnace tapping hole into the pouring ladle 5 which is positioned beneath the discharge end of the inclined trough 3. The ladle 5 is provided with a refractory lining 6 and with the usual trunnions 7, 7, by which it is supported on the ladle hooks 8, 8, of the trolley of an overhead traveling crane. This ladle handling apparatus, being of an old and well-known construction, and not forming part of my invention, is not completely illustrated nor described in detail.

Positioned below the discharge end of the trough 3 and above the open upper end of the pouring ladle 5 is a receptacle forming a slag box 9 into which the steel is delivered as tapped from the furnace together with any slag flowing from the furnace tapping hole, a pool of molten steel being maintained in the box 9 so as to permit of the separation by flotation of any slag entrained in the steel and prevent slag from entering the pouring ladle 5 with the steel, during the furnace tapping operation. The slag being lighter than the steel will rise to and float on the upper surface of the pool and the metal being withdrawn from the bottom of the receptacle or box 9 the entrance of slag into the ladle is effectually prevented.

The receptacle or slag box 9 is arranged to be portable, and preferably will be suspended from the trolley or from an auxiliary trolley on the overhead traveling crane used in transporting the ladle 5. This receptacle or slag box, however, may be removably mounted above the ladle 5 on a stationary support, or other desired manner. The slag box 9 is provided with a refractory lining 10, and has a pouring outlet 11 in its bottom through which the molten steel flows into the ladle 5, the flow of metal through the bottom opening 11 being controlled by a manually operated stopper 12. As shown the stopper 12 is detachably secured on one end of a goose-neck 13 and the goose-neck is removably secured on the stopper operating mechanism 14 which is fastened to one side of the slag box 9. The stopper and stopper operating mechanism and its operating lever 15 shown, are of the usual construction employed with bottom pour ladles, such as the ladle 5, a similar stopper and stopper operating mechanism being employed on the ladle 5 in controlling the flow of steel from this ladle.

The slag box 9 is also provided on its upper marginal edge, at one end of the box, with a shallow slag overflow 16 through which slag floating on top of the pool of molten steel is drained from the slag box after the slag in the box 9 reaches the level of the overflow outlet 16.

In carrying out my improved method the tapping trough or runner 3, when a removable trough is employed, is positioned in front of the tapping hole of the furnace 2. The ladle 5 and slag box 9 are positioned beneath the discharge end of the runner 3 in the position shown in the drawings. The tapping hole of the furnace 2 is then opened in the usual manner, and the steel flows downwardly through the trough or runner 3 into the slag box 9. As the flow of steel from the furnace is not completely under control while the flow of metal through the bottom outlet 11 in the slag box 9 is entirely under control, and as the bottom outlet is restricted in size, the flow of steel into the slag box will be considerably faster than the rate of discharge from the slag box into the ladle 5 beneath the slag box. The size of the slag box, however, is ample to care for a rush of steel from the furnace and prevent filling the slag box so that the steel will overflow from it.

Pouring the steel from the slag box 9 through the restricted opening 11 causes a pool of steel to form in the box and by storing the steel in the slag box in this way during the furnace tapping and ladle filling operations will supply a time interval sufficient to permit of any entrained slag carried from the furnace by the stream of molten steel, being such to float to the top of the pool of molten steel in the box and separate therefrom.

The stopper 12 will be kept in closed position for a short time after metal commences to flow from the furnace, until a pool of metal forms in the box 9 and the flow of metal from the outlet 11 will be controlled thereafter so as to maintain the pool at a level which will cause the larger part of any slag collecting within the box to overflow through the overflow outlet 16.

As the box 9 is shallow compared to the great depth of the ladle 5, intermingling of any slag flowing into the box at the completion of the furnace tapping operations with the pool of steel is effectually overcome and prevented.

When all of the steel has been tapped from the furnace the slag box 9 is allowed to remain in position above the ladle 5 until the pool of steel therein flows into the ladle and in this way is separated from the slag. The stopper 12 on the slag box will be operated to close the bottom outlet 11 and thereby prevent any slag flowing from the slag box into the ladle 5.

The slag box 9 will then be removed from above the ladle 5. The ladle 5 will be carried by the overhead traveling crane to the pouring platform where the ladle 5 is emptied of its contents by pouring the molten steel into a succession of ingot molds.

The slag will be removed from the slag box 9 while the steel is being poured from the ladle 5, and when necessary the lining of the slag box will be patched or the box relined in readiness to be again used.

The advantages of my invention will be appreciated by those skilled in the art. In using the invention, slag is prevented from becoming mixed with the steel, so that steel of the desired composition is more easily obtained. The apparatus used in carrying out the method forming part of my invention is simple and is easily kept in repair.

Modifications in the construction and arrangement of the apparatus used in carrying out my invention may be made without departing from the invention as defined in the appended claims.

I claim:—

1. The method of tapping steel from open-hearth furnaces, which consists in discharging the molten steel from the furnace into a receptacle, pouring the steel from the receptacle into a ladle, and regulating the rate of flow of the steel from the receptacle to maintain a pool of steel therein during the delivery of steel from the furnace, to thereby separate entrained slag from the steel in the receptacle by flotation and prevent the entrance of slag into the ladle.

2. The method of tapping steel from open-hearth furnaces, which consists in discharging the molten steel from the furnace into a receptacle and pouring the steel from the receptacle into a ladle, regulating the rate of flow of the steel from the receptacle to maintain a pool of steel therein and draining the collected slag from the receptacle above the level of the surface of the pool during the delivery of steel from the furnace, to thereby separate entrained slag from the steel in the receptacle by flotation and prevent the entrance of slag into the ladle.

3. Apparatus for tapping open-hearth furnaces, comprising a tapping spout in front of the furnace tapping hole, a slag receptacle positioned to receive molten metal from said tapping spout, said receptacle having an opening in the bottom thereof, and a manually operated stopper for controlling the flow of metal through said opening, and having an overflow outlet in the upper edge of said receptacle forming a spillway for the overflow from molten slag therefrom, and a ladle positioned below the receptacle to receive the molten metal discharged from said receptacle.

4. Apparatus for tapping open-hearth furnaces, comprising a tapping spout in front of the furnace tapping hole, a slag receptacle positioned to receive molten metal from said tapping spout, said receptacle having an opening in the bottom thereof and having an overflow outlet in the upper edge of said receptacle forming a spillway for the overflow of molten slag therefrom, a manually operated stopper for controlling the flow of metal through the opening in said receptacle, and a ladle positioned below the receptacle to receive the molten metal discharged from said receptacle.

In testimony whereof I have hereunto set my hand.

MELTON A. SMITH.